United States Patent [19]

Brown et al.

[11] Patent Number: 5,179,688

[45] Date of Patent: Jan. 12, 1993

[54] QUEUE SYSTEM WITH UNINTERRUPTED TRANSFER OF DATA THROUGH INTERMEDIATE LOCATIONS TO SELECTED QUEUE LOCATION

[75] Inventors: Douglas B. Brown, San Jose; Frederick L. Zardiackas, Sunnyvale; Donald Langston, Santa Clara; Eric K. Goodill, Palo Alto, all of Calif.

[73] Assignee: Tandem Computers Incorporated, Cupertino, Calif.

[21] Appl. No.: 68,699

[22] Filed: Jun. 30, 1987

[51] Int. Cl.⁵ ............................................. G06F 9/315
[52] U.S. Cl. ............................... 395/425; 364/254.5; 364/260; 364/260.2; 364/DIG. 1; 395/550; 395/800
[58] Field of Search ... 364/200 MS File, 900 MS File; 328/63; 395/425, 550, 800

[56] References Cited

U.S. PATENT DOCUMENTS

| | | | |
|---|---|---|---|
| 3,725,876 | 4/1973 | Hauck | 364/200 |
| 3,781,821 | 12/1973 | Roth | 364/900 |
| 3,972,034 | 7/1976 | Derickson, III et al. | 328/37 |
| 4,070,630 | 1/1978 | Hepworth et al. | 328/63 |
| 4,078,258 | 3/1978 | Lindsey et al. | 364/900 |
| 4,110,822 | 8/1978 | Porter | 364/200 |
| 4,138,732 | 2/1979 | Suzuki et al. | 364/900 |
| 4,374,428 | 2/1983 | Barnes | 364/900 |
| 4,399,507 | 8/1983 | Cosgrove | 364/200 |
| 4,466,065 | 8/1984 | Advani et al. | 364/300 |
| 4,481,608 | 11/1984 | Berkowitz | 364/900 |
| 4,488,227 | 12/1984 | Miu | 364/200 |
| 4,553,203 | 11/1985 | Rau et al. | 364/200 |
| 4,558,429 | 12/1985 | Barlow et al. | 364/900 |
| 4,628,477 | 12/1986 | Burrows | 364/900 |
| 4,642,797 | 2/1987 | Hoberman | 365/221 |
| 4,677,545 | 6/1987 | Blahut | 364/200 |
| 4,682,284 | 7/1987 | Schrofer | 364/200 |
| 4,722,049 | 1/1988 | Lahti | 364/200 |
| 4,785,415 | 11/1988 | Karlquist | 364/900 |
| 4,833,605 | 5/1989 | Terada | 364/200 |
| 4,833,655 | 5/1989 | Wolf | 365/221 |
| 4,881,163 | 11/1989 | Thomas | 364/200 |
| 4,890,221 | 12/1989 | Gage | 364/200 |

*Primary Examiner*—Thomas C. Lee
*Assistant Examiner*—Eric Coleman
*Attorney, Agent, or Firm*—Townsend and Townsend

[57] ABSTRACT

A queue has a plurality of serially connected transparent latches forming individual storage locations. The queue includes an entry storage latch for receiving data signals into the queue and an exit storage latch for communicating data signals out from the queue. The output terminal of each latch is connected to the input terminal of a succeeding latch so that data signals received by the entry storage latch may propagate uninterruptedly through one or more storage latches to a predetermined storage location.

36 Claims, 4 Drawing Sheets

| 68  | 1 | 1 | 0 | 0 | 1 | 1 | 1 | 1 | 0 | 0 | 1 | 1 |
|-----|---|---|---|---|---|---|---|---|---|---|---|---|
| 88A | 1 | 1 | 0 | 0 | 1 | 1 | 1 | 1 | 0 | 0 | 1 | 1 |
| 88B | 1 | 1 | 0 | 0 | 1 | 1 | 1 | 1 | 0 | 0 | 0 | 0 |
| 88C | 1 | 1 | 0 | 0 | 1 | 1 | 1 | 1 | 1 | 1 | 1 | 1 |
| 88D | 1 | 1 | 0 | 0 | 1 | 1 | 1 | 1 | 1 | 1 | 1 | 1 |
| 88E | 1 | 1 | 0 | 0 | 0 | 0 | 0 | 0 | 0 | 0 | 0 | 0 |
| 88F | 1 | 1 | 1 | 1 | 1 | 1 | 1 | 1 | 1 | 1 | 1 | 1 |
| 72  | X | X | X | X | X | X | X | X | X | X | X | X |
| 96A | 0 | 0 | 0 | 0 | 0 | 0 | 0 | 0 | 0 | 0 | 0 | 1 |
| 96B | 0 | 0 | 0 | 0 | 0 | 0 | 0 | 0 | 0 | 1 | 1 | 1 |
| 96C | 0 | 0 | 0 | 0 | 0 | 0 | 0 | 1 | 1 | 1 | 1 | 1 |
| 96D | 0 | 0 | 0 | 0 | 0 | 1 | 1 | 1 | 1 | 1 | 1 | 1 |
| 96E | 0 | 0 | 0 | 1 | 1 | 1 | 1 | 1 | 1 | 1 | 1 | 1 |
| 96F | 0 | 1 | 1 | 1 | 1 | 1 | 1 | 1 | 1 | 1 | 1 | 1 |
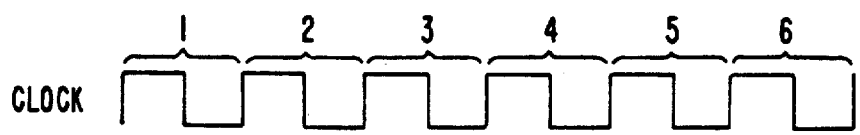
CLOCK
X = DON'T CARE  FIG. 5.
| 68  | X | X | X | X | X | X | X | X | X | X | X |
|-----|---|---|---|---|---|---|---|---|---|---|---|
| 88A | 1 | 1 | 1 | 1 | 1 | 1 | 1 | 1 | 1 | 1 | 1 |
| 88B | 0 | 0 | 0 | 0 | 0 | 0 | 0 | 0 | 0 | 1 | 1 |
| 88C | 1 | 1 | 1 | 1 | 1 | 1 | 1 | 0 | 0 | 1 | 1 |
| 88D | 1 | 1 | 1 | 1 | 1 | 1 | 1 | 0 | 0 | 1 | 1 |
| 88E | 0 | 0 | 0 | 1 | 1 | 1 | 1 | 0 | 0 | 1 | 1 |
| 88F | 1 | 0 | 0 | 1 | 1 | 1 | 1 | 0 | 0 | 1 | 1 |
| 72  | 1 | 1 | 0 | 0 | 1 | 1 | 1 | 1 | 0 | 0 | 1 |
| 96A | 1 | 1 | 1 | 1 | 1 | 1 | 1 | 1 | 1 | 1 | 1 |
| 96B | 1 | 1 | 1 | 1 | 1 | 1 | 1 | 1 | 1 | 0 | 0 |
| 96C | 1 | 1 | 1 | 1 | 1 | 1 | 1 | 0 | 0 | 0 | 0 |
| 96D | 1 | 1 | 1 | 1 | 1 | 0 | 0 | 0 | 0 | 0 | 0 |
| 96E | 1 | 1 | 1 | 0 | 0 | 0 | 0 | 0 | 0 | 0 | 0 |
| 96F | 1 | 0 | 0 | 0 | 0 | 0 | 0 | 0 | 0 | 0 | 0 |
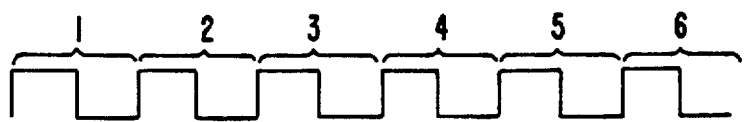
X = DON'T CARE  FIG. 6.

QUEUE SYSTEM WITH UNINTERRUPTED TRANSFER OF DATA THROUGH INTERMEDIATE LOCATIONS TO SELECTED QUEUE LOCATION

BACKGROUND OF THE INVENTION

1. Field of the Invention

This invention relates to data processing systems and, more particularly, to an apparatus for queuing data between a central processor and a peripheral device.

2. Description of the Relevant Art

Data processing systems typically require storage devices in which data are temporarily stored during data transfers. Such devices are used to compensate for differences in processing rate of or event timing between two or more devices. One example of such a device is a first-in/first-out ("FIFO") buffer wherein data is stored sequentially at one rate and subsequently retrieved at another rate in the same order in which it was stored. FIFO buffers typically comprise a plurality of storage registers wherein data is shifted sequentially from an entry location to an exit location, the data being shifted one register position for each clock pulse.

One drawback with conventional devices is that the data must be shifted entirely through the shift register stages before it is available as output. This limits the speed at which the data may be transferred. Furthermore, conventional devices utilize edge triggered devices for each data bit in each shift register stage. This requires a substantial amount of hardware and poses substantial design problems when the circuit designer is allocated very little hardware space.

SUMMARY OF THE INVENTION

The present invention is directed to an apparatus for queuing data signals in a data processing system, wherein data may be communicated immediately to a prescribed storage location within the queue without having to wait for successive clock cycles. In one embodiment of the present invention, a queue has a plurality of serially connected latches forming individual storage locations. The queue includes an entry storage latch for receiving data signals into the queue and an exit storage latch for communicating data signals out from the queue. For minimizing the amount of hardware required to implement the system, each storage latch comprises a "transparent" latch. Such latches communicate data signals from an input terminal to an output terminal thereof in response to a first control signal and maintain data signals at an output terminal thereof in response to a second control signal. The output terminal of each latch is connected to the input terminal of a succeeding latch so that data signals received by the entry storage latch may immediately propagate through one or more storage latches to a predetermined storage location.

A control unit is connected to the queue for communicating the first and second control signals to the plurality of transparent latches. The control unit comprises a shift register having a plurality of shift register stages, each shift register stage being connected to an associated latch. The shift register shifts a series of second control signals from the shift register stage associated with the exit storage latch toward the shift register stage associated with the entry storage latch after each data item is communicated to the predetermined storage latch. As a result, data is stored sequentially from the exit storage latch toward the entry storage latch.

For accessing the data, the shift register sequentially shifts a series of first control signals from the shift register stage associated with the exit storage latch toward the shift register stage associated with the entry storage latch. Consequently, the stored data items flow one at a time through the downstream latches and to the exit storage latch from where they may be sequentially retrieved.

Because of inherent propagation delays through the series of latches, data must be received by the entry storage latch early enough in a clock cycle to propagate through the series of latches before the second control signal is applied to the latch in which the data is ultimately stored. To ensure adequate propagation time in longer queues, an input latch may be placed before the entry storage latch for applying the received data to the entry storage latch at the beginning of each clock cycle. Similarly, data must propagate to the exit storage latch in time for them to be retrieved. To ensure adequate propagation time in this case, an output latch may be placed after the exit storage latch to match the external device s timing requirements.

BRIEF DESCRIPTION OF THE DRAWINGS

FIG. 5 is a diagram illustrating a data storing operation according to the present invention.

FIG. 6 is a diagram illustrating a data retrieval operation according to the present invention.

DETAILED DESCRIPTION OF THE PREFERRED EMBODIMENTS

Figure 1:
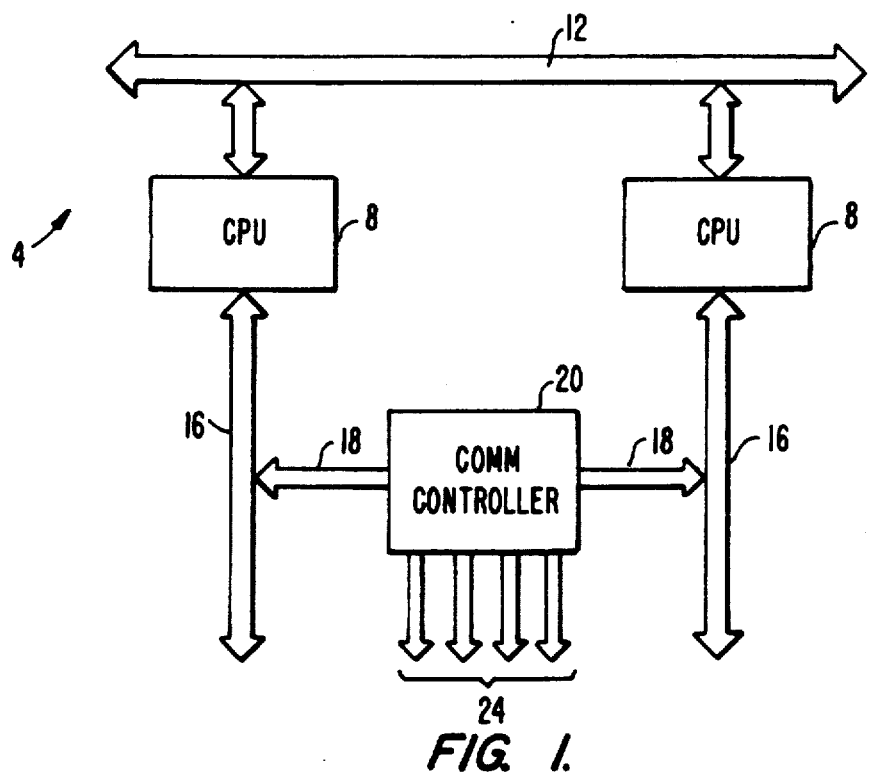
FIG. 1 is a block diagram of a preferred embodiment of a data processing system according to the present invention.

FIG. 1 is a block diagram of a data processing system 4 according to the present invention. Data processing system 4 preferably comprises two or more central processing units (CPU's) 8 which communicate data and information between or among themselves over an interprocessor bus 12. Each CPU 8 communicates data to or from peripheral equipment (not shown) through an I/O channel 16. Because the rate at which data may be transferred to or from CPU 8 may be different from the rate at which data is transferred to or from the peripheral devices, a communication controller 20 communicates with CPU's 8 through I/O channel buses 18 for communicating data to the peripheral units through communication lines 24. Preferably, one communication controller 20 is provided for each pair of CPU s 8.

Figure 2:
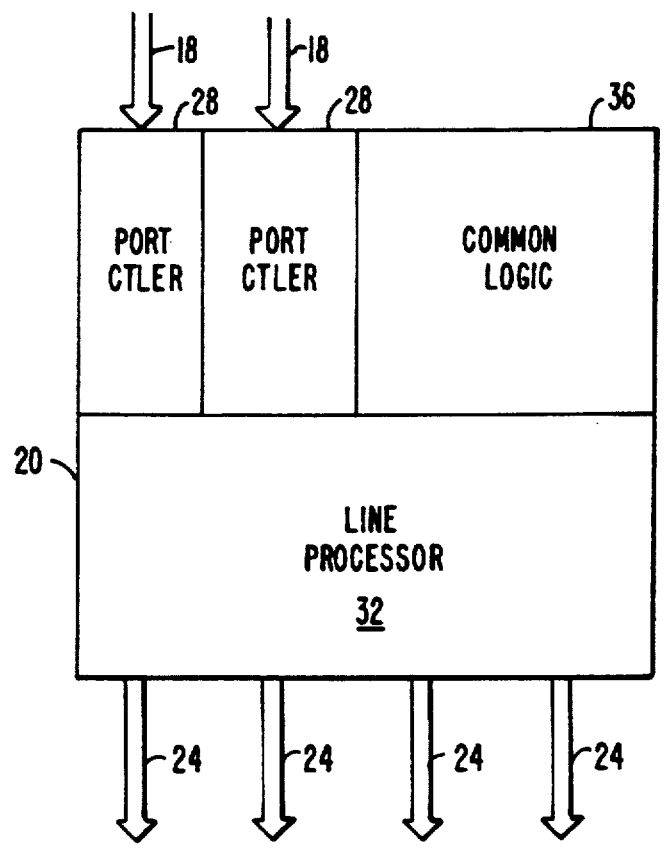
FIG. 2 is a block diagram of an embodiment of the communication controller illustrated in FIG. 1.

As shown in FIG. 2, each communication controller 20 comprises a pair of port controllers 28 for receiving data from I/O channel buses 18, a line processor 32 for communicating data from port controllers 28 to communication lines 24, and a common logic unit 36 for providing common control signals, e.g., reset and clock signals, to port controllers 28 and to line processor 32.

Figure 3:
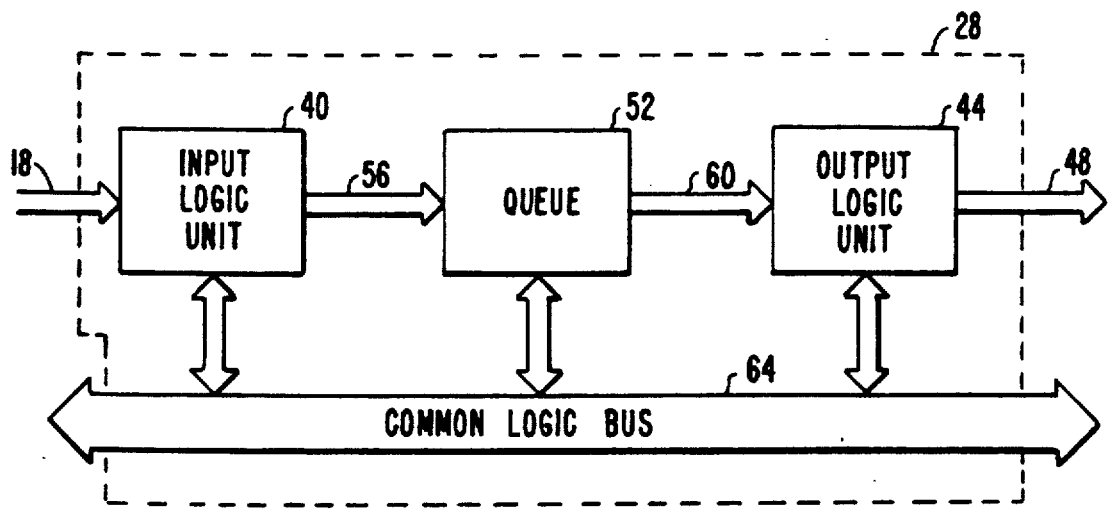
FIG. 3 is a block diagram of an embodiment of the port controller illustrated in FIG. 2.

As shown in FIG. 3, each port controller 28 comprises an input logic unit 40 for receiving data from I/O channel bus 18, an output logic unit 44 for communicating data to line processor 32 over a bus 48, and a queue 52. Queue 52 receives the input data from input logic unit 40 over an input-queue bus 56 in the timing format provided by input logic unit 40 and communicates the data so received to output logic unit 44 over a queue-output bus 60 in the timing format required by output logic unit 44. Input logic unit 40, output logic unit 44 and queue 52 receive control signals from common logic unit 36 over a common logic bus 64.

Figure 4:
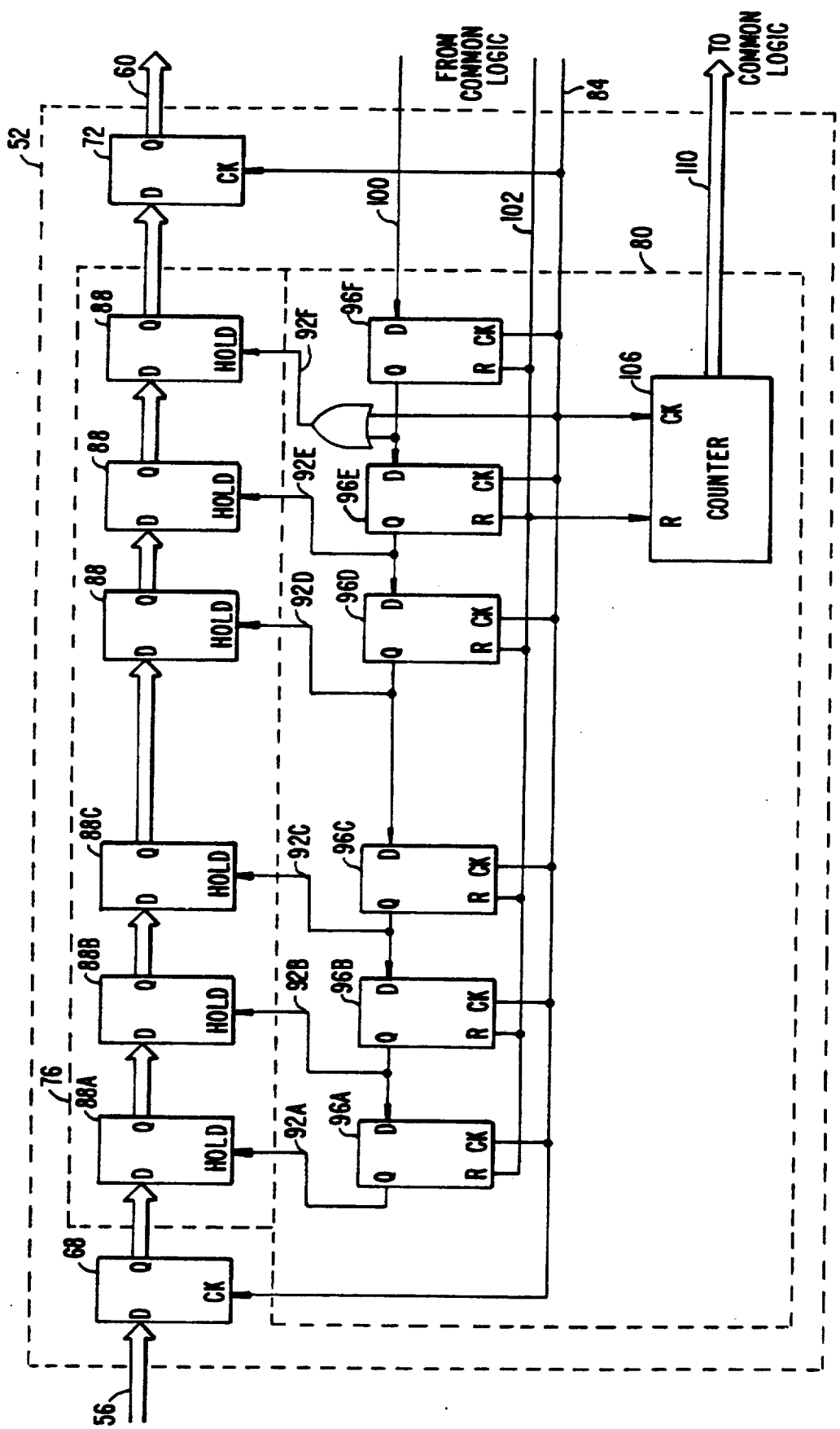
FIG. 4 is a block diagram of an embodiment of the queue illustrated in FIG. 3.

As shown in FIG. 4, queue 52 comprises an input latch 68 for receiving data from input-queue bus 56, an output latch 72 for communicating data to queue-output bus 60, and a queue latch section 76 for receiving the data from input latch 68 and for alternately storing the received data and communicating the stored data to output latch 72. Input latch 68, output latch 72 and queue latch section 76 are controlled by signals received from a control latch section 80. Input latch 68 and output latch 72 may comprise conventional edge triggered latches which are triggered by clock signals received at a CK terminal over a line 84 from common logic unit 36.

Queue latch section 76 comprises a plurality of serially connected transparent latches 88A–88F forming a corresponding plurality of storage locations for data received from input latch 68. In the preferred embodiment, each latch has the capability of processing 16-bit signals, and queue latch section 76 preferably comprises sixteen such latches. However, to simplify the description and understanding of the present invention, only six latches shall be illustrated and described. Latch 88A forms an entry storage latch for receiving data from input latch 68. Similarly, latch 88F forms an exit storage latch for communicating data to output latch 72. Each latch 88A–88F has a hold terminal connected to a corresponding control line 92A–92F from control latch section 80. Each latch 88A–88F communicates data signals received at its D-input terminal to its Q-output terminal when a first control signal is received over its corresponding control line 92A–92F, and it maintains a data signal at its Q-output terminal when a second control signal is received over its corresponding control line 92A–92F.

Control latch section 80 comprises a plurality of serially connected edge triggered latches 96A–96F wherein the D-input terminal of one latch is connected to the Q-output terminal of a preceding latch. Thus, latches 96A–96F form a shift register wherein data received at the D-input terminal of latch 96F over a line 100 from common logic unit 36 is communicated toward latch 96A upon successive clock pulses received over line 84 from common logic unit 36. The clock pulses received over line 84 preferably correspond with the channel loading clock signals of the CPU 8 associated with the queue during data storage and with the line processor loading signals during data access. Each latch 96A–96F has a reset terminal R connected to a reset line 102 from common logic unit 36 for simultaneously resetting each latch and a clock terminal CK connected to line 84. Control latch section 80 further includes a counter 106 for counting clock pulses received over line 84. Counter 106 has a reset terminal R for setting counter 106 to a prescribed value, 0, in response to signals received over reset line 102. Counter 106 communicates the number of clock pulses counted, and hence the number of data items stored or accessed, to common logic unit 36 over a counter bus 110.

Operation of the present invention may be understood by referring to FIGS. 5 and 6. FIG. 5 illustrates a data storage operation when data is received from input logic unit 40, whereas FIG. 6 illustrates a data retrieval operation when data stored within queue 52 is to be communicated to output logic unit 44.

FIG. 5 illustrates the serial loading of one bit position in each latch 88A–88F with the string "101101." The other bit positions in each latch operate in the same manner and shall not be described. At the leading edge of clock pulse 1, a "1" appears at the Q-output of input latch 68. Since each latch 88A–88F has a "0" at its hold input terminal, the signal propagates through each latch and appears at the Q-output of latch 88F. At the falling edge of clock pulse 1, a "1" is shifted into edge triggered latch 96F and appears on line 92F. As a result, latch 88F maintains the "1" at its Q-output irrespective of the data appearing at its D-input terminal.

At the leading edge of clock pulse 2, a "0" appears at the Q-output terminal of input latch 68 and propagates through latches 88A–88E. At the falling edge of pulse 2, another "1" is shifted into latch 96F, and the "1" originally at the Q-output terminal of latch 96F is shifted into latch 96E and appears at the Q-output terminal thereof and on line 92E. Accordingly, latch 88E has a "1" at its hold input terminal, and the "0" is maintained at the Q-output terminal of latch 88E irrespective of the data appearing at its D-input terminal.

At the leading edge of pulse 3, a "1" appears at the Q-output terminal of input latch 68 and propagates through latches 88A–88D. At the falling edge of pulse 3, a "1" is shifted into latch 96F, the "1's" appearing at the Q-output terminals of latches 96F and 96E shift to the left, and a "1" appears at the Q-output terminal of 96D and on line 92D. Since latch 88D now has a "1" at its hold input terminal, the "1" is maintained at the Q-output terminal of latch 88D.

At the leading edge of pulse 4, another "1" appears at the Q-output terminal of input latch 68 and propagates through latches 88A–88C. The series of "1's" within control latch section 80 are further shifted left, and a "1" appears on line 92C for maintaining the "1" at the Q-output terminal of latch 88C.

At the leading edge of pulse 5, a "0" appears at the Q-output terminal of input latch 68 and propagates through latches 88A and 88B. At the falling edge of clock pulse 5, a "1" appears on line 92B for maintaining the "0" at the Q-output terminal of latch 88B.

Finally, a "1" appears at the Q-output terminal of input latch 68 on the leading edge of clock pulse 6 and propagates to the Q-output terminal of latch 88A. At the falling edge of pulse 6 a "1" appears on line 92A, and the "1" is maintained at the Q-output terminal of latch 88A. The value of "101101" thus will be maintained within queue latch section 76.

For serially accessing data from exit latch 88F, a similar procedure is followed, except that "0's" are shifted left through control latch section 80. As shown in FIG. 6, the "1" already at the Q-output terminal of latch 88F appears at the Q-output terminal of output latch 72 at the leading edge of pulse 1. At the falling edge of pulse 1, a "0" is shifted into latch 96F and appears on line 92F. As a result, latch 88F is rendered transparent and the "0" at its D-input terminal propagates to its Q-output terminal. The "0" in turn, appears at the Q-output terminal of output latch 72 at the leading edge of pulse 2.

At the falling edge of pulse 2, another "0" is shifted into latch 96F, and the "0" originally appearing at its Q-output terminal is shifted into latch 96E and appears on line 92E. This signal renders latch 88E transparent, and the "1" appearing at its D-input terminal propagates to the Q-output terminal of latch 88F. The "1" then appears at the Q-output terminal of output latch 72 at the leading edge of pulse 3.

At the falling edge of pulse 3, the series of "0's" again shifts left, and a "0" appears on line 92D for propagating the "1" from the D-input terminal of latch 88D through latches 88D, 88E and 88F. The "1" then appears at the output terminal of output latch 72 at the leading edge of pulse 4.

At the falling edge of pulse 4, a "0" is shifted into latch 96C and appears on line 92C. As a result, the "0" at the input terminal of latch 88C propagates through latches 88C, 88D, 88E, and 88F. The "0", in turn, appears at the Q-output terminal of output latch 72 at the leading edge of pulse 5.

At the falling edge of pulse 5, a "0" is shifted into latch 96B and appears on line 92B. Consequently, the "1" at the D-input terminal of latch 88B propagates through latches 88B, 88C, 88D, 88E, and 88F. The "1", in turn, appears at the Q-output terminal of output latch 72 at the leading edge of pulse 6A. Thus, the pulse string "101101" has been serially accessed from exit latch 88F and communicated to output logic unit 44 through output latch 72.

During the input and output operation of queue 52, counter 106 counts the number of data items stored within the queue and communicates the count value to common logic 36 through count bus 110. In this manner, common logic unit 36 may control the number of data items stored or retrieved from queue 52.

While the above is a complete description of a preferred embodiment of the present invention, various modifications are obvious to those skilled in the art. For example, either or both of input latch 68 or output latch 72 may be omitted so that data appearing on input-queue bus 56 may immediately propagate through queue latch section 76, or the data appearing at the Q-output terminal of exit latch 88F may immediately propagate to queue-output bus 60. Whether or not these components are used depends on the propagation delay in queue 52 and the timing requirements of input logic unit 40 and output logic unit 44.

Figure 7:
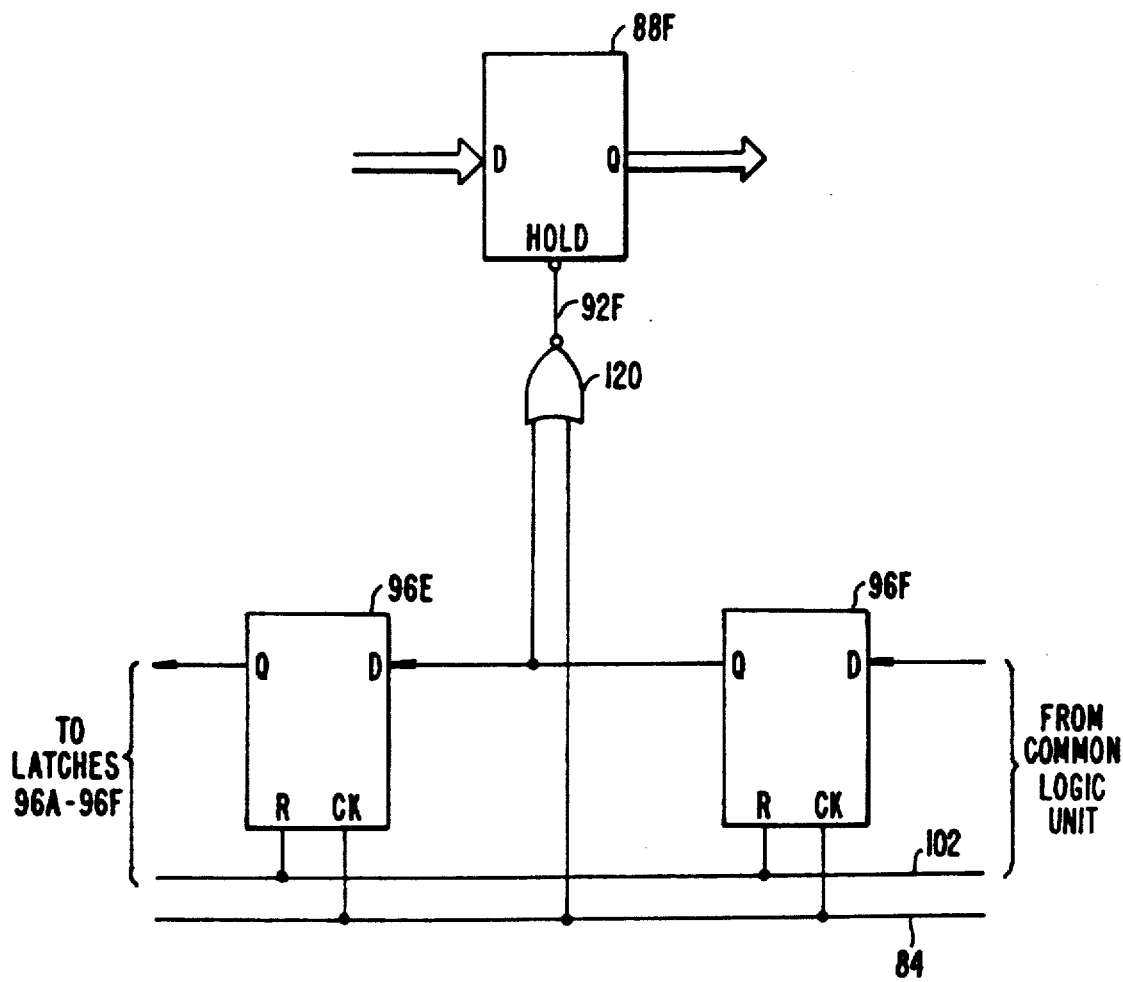
FIG. 7 is a diagram of an alternative embodiment of the queue illustrated in FIG. 3.

In another embodiment of the present invention, output latch 72 may be replaced by a NOR gate 120 disposed in line 92F, as shown in FIG. 7. In this embodiment, a "1" appears on line 92F whenever both inputs to NOR gate 120 are "0". The signal on line 92F is inverted at the hold input terminal of latch 88F. During the high portion of each clock pulse, a "1" is input to NOR gate 120 and appears as a "0" on line 92F which, in turn, is inverted and appears as a "1" at the hold input terminal of latch 88F. Thus, for the positive portion of each clock pulse during a read operation, latch 88F is in a hold state and prevents the data at its Q-output terminal from being destroyed before the data is used by output logic unit 44. A similar scheme may be used at the input latch 88A if desired.

Consequently, the scope of the invention should not be limited except as properly described in the claims.

We claim:

1. An apparatus for queueing data signals in a data processing system comprising:

queue means having a plurality of individual storage locations connected in series, the queue means including an entry storage location for receiving data signals into the queue means and an exit storage location for communicating data signals out of the queue means;

communicating means, connected to the queue means, for uninterruptedly communicating data signals from the entry storage location through a plurality of individual storage locations and to a first selected storage location; and storing means for storing the data signals in the first selected storage location.

2. The apparatus according to claim 1 further comprising retrieving means for sequentially retrieving data signals stored in the queue means through the exit storage location.

3. The apparatus according to claim 2 wherein the retrieving means communicates data signals from a second selected storage location uninterruptedly through an individual storage location and to the exit storage latch.

4. The apparatus according to claim 2 wherein each storage location comprises a latch, the latch including means for communicating data signals from an input terminal to an output terminal thereof in response to a first control signal.

5. The apparatus according to claim 4 wherein the latch includes means for maintaining a data signal at an output terminal thereof in response to a second control signal.

6. The apparatus according to claim 5 wherein the communicating means further comprises first control means, connected to the queue means, for emitting the first control signal, and wherein the storing means further comprises second control means for emitting the second control signal.

7. The apparatus according to claim 6 wherein the first and second control means together comprise a shift register having a plurality of shift registers stages, each shift register stage being connected to an associated latch, for sequentially shifting a selected first or second control signal through each shift register stage and for applying the selected first or second control signal to an associated latch.

8. The apparatus according to claim 7 wherein the shift register forms the retrieving means, the shift register communicating a first control signal to the exit storage latch so that the data signal from the second selected storage location appears at the output terminal of the exit storage latch.

9. The apparatus according to claim 8 wherein for any integer n greater than two and for any integer $m = 1, 2, \ldots, n$, there are n latches, the first latch forming the entry storage location, termed the entry storage latch, and the $n^{th}$ latch forming the exit storage location, termed the exit storage latch, and there are m data signals sequentially received by the entry storage latch.

10. The apparatus according to claim 9 wherein the first control signal is communicated to the last m latches when the $(m+1)^{th}$ data signal is accessed from the exit storage data.

11. The apparatus according to claim 10 wherein the first control signal is communicated to the last m latches and the second control signal is communicated to the first $(n-m)$ latches after the $(m+1)^{th}$ data signal is accessed from the exit storage latch.

12. The apparatus according to claim 1 wherein each storage location comprises a latch, the latch including means for communicating data signals from an input terminal to an output terminal thereof in response to a first control signal.

13. The apparatus according to claim 12 wherein the latch includes means for maintaining a data signal at an output terminal thereof in response to a second control signal.

14. The apparatus according to claim 13 wherein the communicating means further comprises first control means, connected to the queue means, for emitting the first control signal, and wherein the storing means further comprises second control means for emitting the second control signal.

15. The apparatus according to claim 14 wherein for any integer n greater than two and for any integer $m = 1, 2, \ldots, n$, there are n latches, the first latch forming the entry storage location, termed the entry storage latch, and the $n^{th}$ latch forming the exit storage location, termed the exit storage latch, and there are m data signals sequentially received by the entry storage latch, and wherein the second control means emits a second control signal to the $(n+1-m)^{th}$ latch after the $m^{th}$ data signal is received by the $(n+1-m)^{th}$ latch.

16. The apparatus according to claim 15 wherein the first control means communicates the first control signal to the first $(n+1-m)$ latches when the $m^{th}$ data signal is received by the entry storage latch.

17. The apparatus according to claim 16 wherein the first control signal is communicated to the first $(n-m)$ latches and the second control signal is communicated to the next m latches after the $m^{th}$ data signal is received by the $(n+1-m)^{th}$ latch.

18. The apparatus according to claim 16 wherein the first and second control means together comprise a shift register having a plurality of shift register stages, each shift register stage being connected to an associated latch, for sequentially shifting a selected first or second control signal through each shift register stage and for applying the selected first or second control signal to an associated latch.

19. An apparatus for queueing data signals in a data processing system comprising:

queue means having a plurality of individual storage locations connected in series, the queue means including an entry storage location for receiving data signals into the queue means and an exit storage location for communicating data signals out of the queue means;

communicating means, connected to the queue means, for uninterruptedly communicating data signals from the entry storage location through a plurality of individual storage locations and to a first selected storage location; and retrieving means for sequentially retrieving data signals stored in the queue means through the exit storage location.

20. The apparatus according to claim 19, wherein each storage location comprises a latch, the latch including means for communicating data signals from an input terminal to an output terminal thereof in response to a first control signal.

21. The apparatus according to claim 20 wherein the latch includes means for maintaining a data signal at an output terminal thereof in response to a second control signal.

22. The apparatus according to claim 21 wherein the communicating means further comprises first control means, connected to the queue means, for emitting the first control signal, and wherein the storing means further comprises second control means for emitting the second control signal.

23. The apparatus according to claim 22 wherein for any integer n greater than two and for any integer $m = 1, 2, \ldots, n$, there are n latches, the first latch forming the entry storage location, termed the entry storage latch, and the $n^{th}$ latch forming the exit storage location, termed the exit storage latch, and there are m data signals sequentially received by the entry storage latch, and wherein the second control means emits a second control signal to the $(n+1-m)^{th}$ latch after the $m^{th}$ data signal is received by the $(n+1-m)^{th}$ latch.

24. The apparatus according to claim 23 wherein the first control means communicates the first control signal to the first $(n+1-m)$ latches when the $m^{th}$ data signal is received by the entry storage latch.

25. The apparatus according to claim 24 wherein the first control signal is communicated to the first $(n-m)$ latches and the second control signal is communicated to the next m latches after the $m^{th}$ data signal is received by the $(n+1-m)^{th}$ latch.

26. The apparatus according to claim 24 wherein the first and second control means together comprise a shift register having a plurality of shift register stages, each shift register stage being connected to an associated latch, for sequentially shifting a selected first or second control signal through each shift register storage and for applying the selected first or second control signal to an associated latch.

27. The apparatus according to claim 26 wherein the retrieving means communicates data signals from a second selected storage location uninterruptedly through an individual storage location and to the exit storage latch.

28. The apparatus according to claim 27 wherein the shift register forms the retrieving means, the shift register communicating the first control signal to the exit storage latch so that the data signal from the second selected storage location appears at the output terminal of the exit storage latch.

29. The apparatus according to claim 28 wherein the first control signal is communicated to the last m latches when the $(m+1)^{th}$ data signal is accessed from the exit storage latch.

30. The apparatus according to claim 29 wherein the first control signal is communicated to the last m latches and the second control signal is communicated to the first $(n-m)$ latches after the $(m+1)^{th}$ data signal is accessed from the exit storage latch.

31. The apparatus according to claim 30 further comprising entry delay means for receiving a data signal during one clock cycle and for communicating the data signal to the entry storage latch during a succeeding clock cycle.

32. The apparatus according to claim 30 further comprising exit delay means for receiving a data signal from the exit storage latch during one clock cycle and for communicating the data signal out of the queue means during a succeeding clock cycle.

33. The apparatus according to claim 30 further comprising exit delay means, connected to the exit storage latch, for communicating the second control signal to the exit storage latch during a portion of a clock cycle and for communicating the first control signal to the exit storage latch during a succeeding portion of the clock cycle.

34. An apparatus for queueing data signals in a data processing system comprising:
- queue means having a plurality of individual storage locations connected in series, the queue means including an entry storage location for receiving data signals into the queue means and an exit storage location for communicating data signals out of the queue means;
- communicating means, connected to the queue means, for uninterruptedly communicating data signals from the entry storage location through an individual storage location and into a first selected storage location; and
- storing means for storing the data signals in the first selected storage location.

35. An apparatus for queueing data signals in a data processing system comprising:
- queue means having a plurality of individual storage locations connected in series, the queue means including an entry storage location for receiving data signals into the queue means and an exit storage location for communicating data signals out of the queue means;
- communicating means, connected to the queue means, for uninterruptedly communicating data signals from an input terminal of the entry storage location, through the entry storage location, through an individual storage location and to a first selected storage location; and
- storing means for storing the data signals in the first selected storage location.

36. An apparatus for queueing data signals in a data processing system comprising:
- queue means having a plurality of individual storage locations connected in series, the queue means including an entry storage location for receiving data signals into the queue means and an exit storage location for communicating data signals out of the queue means;
- communicating means, connected to the queue means, for uninterruptedly communicating data signals from the entry storage location through an individual storage location and to a first selected storage location, for uninterruptedly communicating data signals from said first selected storage location through an individual storage location to said exit storage location; and
- storing means for storing the data signals in the first selected storage location.

* * * * *